Patented Aug. 7, 1951

2,562,898

UNITED STATES PATENT OFFICE 2,562,898

LIGNIN RESINS AND PROCESS OF MAKING SAME

Raymond Norris Evans and Angelo Paul Ingrassia, Laurel, Miss., assignors to Masonite Corporation, Laurel, Miss., a corporation of Delaware No Drawing. Application May 24, 1946, Serial No. 672,157

6 Claims. (Cl. 260—17.3)

This invention relates to resins having high resistance to alkali and water and made from components comprising lignin in substantial proportions, and the methods of making and using such resins.

By the present invention, lignin, which is substantially soluble in alkali, forming dark-colored solutions, is reacted with an alcohol, an amino-triazine and an aldehyde, whereby resin is formed which is resistant to alkali, resistant to absorption of water, and has thermo-setting characteristics. In order to obtain intimate admixture of the reaction components and thus facilitate their reaction, they may be intimately mixed in dry state in a conventional mixing apparatus or they may be put into solution in organic solvents adapted to dissolve the reactive components.

The resins prepared in accordance with the present invention may be used alone or together with other resinous bodies in various ways, as in the preparation of solutions for impregnating and laminating purposes, or in the preparation of protective coatings and varnishes, or for the formation of molded articles. In connection with the latter use, the resin may be used in molding powder form with or without suitable fillers. Fibrous laminae bonded together with the cured resins of the present invention have strong laminated bonds and have low water absorption characteristics. The cured resins are especially effective as laminating materials in the production of laminated paper, hardboard, and plywood, in bonding laminates and wood veneer to plastics, metals, wood, fibrous boards, and the like, and in protective coatings for material in sheet, wire, and may be used in other forms. The resins are also effective for addition to hydrolyzed ligno-cellulose fiber materials which are to be formed into sheet products under heat and pressure, and in such case, the lignin component of the resin may be supplied or supplied in part by the ligno-cellulose fiber thus making it possible for the lignin resin to be formed in situ.

The main objects of the invention are the provision of resin made from lignin, an alcohol, an amino-triazine and an aldehyde, and of products containing such resin and acid-hydrolyzed ligno-cellulose fiber, which resins and products are of high alkali resistance, and are resistant to absorption of water, and have thermo-setting characteristics, and the provision of methods for the production of such resins and resin-containing products.

In carrying out the present invention, lignin is caused to react and condense with an alcohol, preferably furfuryl alcohol, an amino-triazine, preferably melamine, and an aldehyde, preferably formaldehyde, at an elevated temperature. The furfuryl alcohol may be partially polymerized before use thereof as one of the components of the reaction. If desired, the melamine and the formaldehyde may be reacted to form a condensation product (one of such condensation products is sold under the trade name "Melmac" 402), before addition to and reaction with the lignin to form the novel lignin resins. As hereinafter described, other substances capable of condensing with resins, such as resorcinol for example, may be added to the reaction mixture.

The proportions of the reactants may vary within fairly wide limits. Excellent results have been obtained with proportions ranging from about 1 to 3 moles of furfuryl alcohol to 1 mole of melamine and 2 or 3 moles, preferably 3, of formaldehyde. The quantity of lignin may be up to about 80%, preferably about 25 to 40% based upon the weight of the melamine. Using 1 mole of furfuryl alcohol, 1 mole of melamine, and 3 moles of formaldehyde, approximately 30% lignin (percentage of total weight of reactants) has formed good lignin resins.

It is preferred that the reactants be initially dissolved in a suitable organic solvent which will dissolve the components. Suitable organic solvents include oxygenated organic compounds such as mono alkyl ethers of ethylene glycol, as for example methyl "Cellosolve" and ethyl "Cellosolve," dioxane, tetra hydro furfuryl alcohol, and the like, or mixtures thereof. Such organic solvents may or may not enter into the reaction.

Although melamine is the preferred triazine which can be used as one of the components in the reaction, other triazines may be used. Other triazine compounds which may be used include melamine derivatives, such as 2,4,6 triethyl triamino-1,3,5 triazine, 2,4,6 triphenyl triamino-1,3,5 triazine, and the like, ammeline, ammelide, formoguanamine, and the like. Also, although formaldehyde is the preferred aldehyde to be used as one of the components in the reaction, other aldehydes, such as for example, acetaldehyde, furfural, benzaldehyde, and the like, and mixtures thereof may be used. Also, although furfuryl alcohol is the preferred alcohol for use in the present reaction, other alcohols may be used, such as methyl, ethyl and butyl alcohol, glycols, glycerol, carbitols, and mixtures and derivatives thereof may be used.

The alkali soluble lignin used in the reaction is preferably provided by subjecting wood or other ligno-cellulose material to hydrolysis in the presence of mild acids. The acid-hydrolyzed ligno-cellulose material is preferably prepared by subjecting wood chips to the action of high-pressure steam in a closed chamber, as for example a gun, as described in U. S. patent to Mason, No. 1,824,221. In such treatment, organic acids, such as acetic and formic are formed, and acid hydrolysis of the ligno-cellulose is effected, with lignin being set free. After treatment with steam, the contents of the gun are disintegrated preferably by being explosively discharged from the region of high steam pressure to a region of substantially atmospheric pressure. Materials so produced have a pH of about 3 to 4.

The time required for the steam treatment decreases rapidly with increase of the steam pressure. For example, 25 minutes treatment with steam at 275 p. s. i. (temperature of 212° C.), has approximately the same effect as treatment for 5 seconds with steam at 1000 p. s. i. (temperature of 285° C.). Such treatment is well-adapted for production of fiber for making hardboard, and like products.

In general, the longer the steam treatment is continued at a given temperature, the higher is the proportion of the freed soluble lignin, and such longer steam treatment is preferable in case the lignin is to be extracted. For example, fiber obtained from wood chips subjected to steam raised to 600 p. s. i. in 30 seconds, then raised to 1000 p. s. i. and held for 5 seconds, followed by preferably explosive disintegration, contains a good proportion of extractible lignin, as for example 10 to 12% on dry weight of chips. Higher yields of such lignin can be extracted from ligno-cellulose material given a steam treatment of 15 or more seconds with steam at 1000 p. s. i., for example. For illustration, a typical figure for yield of soluble lignin from wood chips treated with steam at 1000 p. s. i. for 15 seconds and then disintegrated by explosive discharge is about 17–18% based on dry weight of chips. The steam-treated and disintegrated material is preferably washed with water to largely remove the water-soluble organic acids, such as formic and acetic, and water-soluble derivatives of hemi-cellulosic material.

For extraction of the lignin from acid-hydrolyzed ligno-cellulose, dilute alkali solution, such as 1–3% sodium hydroxide solution for example, is preferably used, and the lignin precipitated by acidifying the solution, as for example by addition of hydrochloric acid, and then separated from the liquid by filtration. The separated lignin is preferably further treated with dilute mineral acid, such as hydrochloric or sulfuric, to set free any cations picked up in the process, filtered and washed with distilled water. Instead of treating with dilute alkali, organic solvents, such as methyl "Cellosolve," for example, can be used to dissolve the lignin, and the lignin recovered by precipitating in water or by evaporating the solvent or in other ways. Treating the entire mass of hydrolyzed ligno-cellulose with such organic solvents is expensive and it is preferred to extract the lignin therefrom with dilute alkali solution and precipitate it and then confine the treatment with the organic solvents to the lignin material so obtained. The lignin used for resin making in examples below was prepared by treatment of acid-hydrolyzed exploded wood fiber with 3% sodium hydroxide solution at a temperature of 50° C., and precipitated with dilute hydrochloric acid and washed, as above described. Such lignin when precipitated and dried is light and fluffy.

The hydrolyzed ligno-cellulose fiber for making sheet and the like products or filler material is prepared, for example, by subjecting wood or other ligno-cellulose material to the action of high pressure steam, as described above. The hydrolysis treatment of the ligno-cellulose material is, however, generally not so severe as that applied to ligno-cellulose material which is hydrolyzed for the purpose of providing material from which to obtain lignin by extraction. The less severe hydrolysis is applied in preparation of the fiber stock in order to retain a better degree of fiber structure. The acid-hydrolyzed ligno-cellulose fiber stock thus prepared contains about 5 to 12% lignin (based on the weight of the ligno-cellulose material) freed as a result of the hydrolysis. This lignin contained in the hydrolyzed ligno-cellulose material will readily react with the melamine and formaldehyde components. If desired, additional lignin may be added with the melamine and formaldehyde components to increase the amount of lignin in the final reaction product, and such additional lignin may or may not have been previously reacted with the furfuryl alcohol, melamine and the formaldehyde.

Parts in the examples which follow are parts by weight.

In Example A different alcohols were mixed with lignin, melamine and formaldehyde and heated to determine the relative reactivity of different alcohols in preparing resins. The experiments were carried out as follows:

*Example A.*—To about 3 parts of lignin, 10 parts melamine and 19 parts 37% formaldehyde, the following quantities of different alcohols were added annd heated as indicated in the table.

| Alcohol added | None | Furfuryl | Butyl | Methyl "Cellosolve" | Ethyl | Ethylene Glycol | Glycerol |
|---|---|---|---|---|---|---|---|
| Weight of alcohol added (parts) | 0 | 7.8 | 5.9 | 6.1 | 3.7 | 4.9 | 7.3 |
| Original weight | 32.4 | 41.0 | 38.4 | 38.0 | 35.7 | 37.7 | 41.6 |
| Weight after 15 hrs. at 50° C | 28.9 | 34.6 | 34.5 | 32.4 | 30.8 | 32.8 | 37.6 |
| Weight after 23 more hrs. at 100° C. | 17.5 | 22.5 | 22.8 | 21.7 | 23.5 | 22.0 | 24.2 |
| Weight after 8 more hrs. at 200° C | 15.2 | 20.2 | 17.3 | 17.4 | 16.1 | 19.0 | 20.3 |
| Increase over Blank |  | 5.0 | 2.1 | 2.2 | .9 | 3.8 | 4.6 |
| Percent Alcohol reacted |  | 64 | 35 | 36 | 25 | 78 | 63 |

Ethylene glycol, furfuryl alcohol and glycerol show very good relative reactivity when added to lignin, melamine and formaldehyde as described.

The following examples illustrate the preparation of resinous products in accordance with the present invention, and show the relative high hardness and resistance to alkali and water of such products:

*Example 1*

490 parts of furfuryl alcohol, 1130 parts of a condensation product of melamine and formaldehyde (resin known as No. 402 Melmac, hereinafter called "Melmac") and 500 parts of water were heated under a reflux condenser for 4 hours at 98° C. and then subjected to vacuum evaporation for 1 hour at 80° C. to form a resin. The thus-formed partially-condensed resin had the following properties; acid number 0.2; viscosity at 70° C.—7 minutes (water 10 seconds).

412 parts of this resin were mixed with 103 parts of lignin and 100 parts of methyl "Cellosolve" and heated under a reflux condenser at 60°–70° C. The mixture formed a soft gel in about 10 minutes.

The resin was heated in an oven at 130° C. for approximately ½ hour when it was hard enough to grind. The reacted resin was ground to a fineness so that the powdered resin passed through a 40-mesh screen.

The powdered resin was further heated in an oven at 130° C. for about 30 minutes, placed in a mold and heated and pressed at a temperature of about 165° C. and pressure of about 1750 p. s. i. for a period of about 5 minutes and chilled while under pressure. The molded product had the following characteristics:

Specific gravity_____ 1.40
Hardness (Rockwell M)_____ 121
24 hour immersion in 1% alkali:
    Per cent uptake_____ .3
    Per cent swell_____ Nil
    Color of alkali solution_____ Clear

Example 2

2950 parts of furfuryl alcohol, 6780 parts of a condensation product of melamine and formaldehyde (Melmac resin), and 3000 parts of water were heated under a reflux condenser for about 4 hours at 95° C. and then subjected to vacuum evaporation for 10 hours at about 70° to 90° C. to form a resin.

450 parts of this resin were mixed with 85.5 parts of lignin and about 200 parts of methyl "Cellosolve" and the mixture stirred. To the thus-prepared liquid resin (resin solids 50.5%), hydrolyzed ligno-cellulose fiber was added in the ratio of 1 part of resin solids to 2 parts of fiber by weight and mixed in a Baker-Perkins mixer. The mixed materials were heated in a vacuum oven at 55° C. for 2 hours, followed by air drying at 40° C. for 17 hours to drive off a substantial quantity of the volatiles.

The dried fiber-resin mixture was ground to a fineness so that the powdered material passed through a 40-mesh screen. At this stage the volatile content of the fiber-resin mixture was 15%.

A molded specimen of this fiber-resin mixture was prepared in a heated pressure mold in the same manner as described in Example 1, and had the following characteristics:

Specific gravity_____ 1.40
Modulus of rupture, p. s. i_____ 10,500
Hardness (Rockwell M):
    Room temp_____ 89
    105° C_____ 26
24 hour water immersion, per cent uptake 2.8
24 hour 1% alkali immersion, per cent uptake _____ 3.6

Example 3

200 parts of furfuryl alcohol, 450 parts of a condensation product of melamine and formaldehyde (Melmac resin), 125 parts of lignin, and about 275 parts of methyl "Cellosolve" were mixed and heated under reflux for 3 hours at about 60° C.

100 parts of the resin-"Cellosolve" solution were mixed with 130 parts of alpha cellulose in a Baker-Perkins mixer. A similar mixture was prepared with acid-hydrolyzed ligno-cellulose fiber in place of the alpha cellulose. The volatiles were partially removed from each mix by heating the mixes for about ½ hour at 130° C.

The dried mixes were ground to a fineness so that the powdered fibrous-resin material passed through a 40-mesh screen. A molded specimen was prepared of each mix under the molding conditions described in Example 1. The alpha cellulose and hydrolyzed ligno-cellulose samples contained 7.7% and 7.0% volatiles respectively, at time of molding. The finished molded products had the following characteristics:

|  | Alpha Cellulose | Hydrolyzed Ligno-Cellulose Fiber |
|---|---|---|
| Specific Gravity | 1.44 | 1.38 |
| Modulus of Rupture, p. s. i | 14,400 | 11,675 |
| Hardness (Rockwell M): |  |  |
|   Room Temp | 99 | 106 |
|   105° C | 73 | 55 |
| 24 Hour Water Immersion, Per Cent Uptake | 2.8 | 1.3 |
| 24 Hour 1% Alkali Immersion, Per Cent Uptake | 4.1 | 2.5 |

Example 4

Commercial furfuryl alcohol was partially polymerized or resinified as follows:

235 parts of furfuryl alcohol, 170 parts of water and 2.5 parts of phthalic anhydride were refluxed for 3 hours at 100° C. and subjected to vacuum evaporation for 14 hours at 55°–90° C. The yield of resinified furfuryl alcohol was 187 parts. The resinified furfuryl alcohol contained 93% solids, 1% water and had an acid number of 3.5 (milligrams of NaOH per gram of resinified furfuryl alcohol).

83 parts of the partially polymerized furfuryl alcohol so prepared, together with 165 parts of a condensation product of melamine and formaldehyde (Melmac) and 74 parts of lignin, were dissolved in about 350 parts of methyl "Cellosolve." The mixture was stirred and heated in a container, with a reflux condenser attached, for 3 hours at 60° C.

100 parts of the resinous solution so prepared were mixed with 122 parts of hydrolyzed ligno-cellulose fiber in a Baker-Perkins mixer. The mixed mass was heated in an oven at 130° C. for ½ hour to remove a substantial proportion of the volatiles. The dried fibrous-resinous mixture was ground to a fineness so that the powdered material passed through a 40-mesh screen.

A molded specimen was prepared in the same manner as described in Example 1 (sample contained 5% volatiles at time of molding), and had the following characteristic:

Specific gravity_____ 1.37
Modulus of rupture p. s. i_____ 8,580
Hardness (Rockwell M):
    Room temp_____ 99
    105° C_____ 53
24 hour water immersion, per cent uptake___ 1.8
24 hour 1% alkali immersion, per cent uptake _____ 2.7

Another specimen was prepared in which the partially polymerized furfuryl alcohol was first reacted with "Melmac" and subsequently the reacted mass was further reacted with lignin, and the resulting specimen had characteristics similar to these just given in the table.

Example 5

A resin was prepared as described in Example 3 except that the furfuryl alcohol had previously been partially polymerized. 154 parts of this resin were heated with 10 parts of resorcinol under reflux at temperature of 70° C. for about 1 hour. The resulting resin was mixed with acid-hydrolyzed ligno-cellulose fiber in a Baker-Perkins mixer. The fiber-resin mixture was heated in an oven at 105° C. for about 35 minutes to remove a substantial part of the volatiles. After heating, the dried mixture was ground to a fineness so that the powdered fiber-resin mixture passed through a 40-mesh screen.

A molded specimen was then prepared under the molding conditions described in Example 1 (Sample contained 5% volatiles at time of molding). The finished molded product had the following characteristics:

| | |
|---|---|
| Specific gravity | 1.39 |
| Modulus of rupture, p. s. i | 10,720 |
| Hardness (Rockwell M): | |
| Room temp | 105 |
| 105° C | 72 |
| 24 hour water immersion, per cent uptake | 1.1 |
| 24 hour 1% alkali immersion, per cent uptake | 2.8 |

Example 6

237 parts of lignin were dissolved in 660 parts commercial furfuryl alcohol. 945 parts melamine were dissolved in 1944 parts of 37% formaldehyde. The two solutions were mixed and heated for about 30 minutes at a temperature of about 60° C. to form a resin solution.

1312 parts of the above resin solution were mixed with about 17,275 parts of an aqueous acid-hydrolyzed ligno-cellulose fiber slurray (about 3% fiber consistency) and stirred for about 10 minutes at a temperature of about 70° C. The resin-fiber aqueous mixture was formed into a fiber mat on a wire screen, the aqueous liquid being drawn off through the wire. After air drying the fiber mat for about 24 hours, the volatile contents were adjusted to about 4.5%.

The fiber mat was placed in a hot platen press and pressed at a pressure of 2000 p. s. i. with the platen temperature at about 140° C. for a period of 5 minutes and chilled while under pressure.

The resulting product had substantially the following characteristics:

| | |
|---|---|
| Specific gravity | 1.40 |
| Modulus of rupture, p. s. i | 11,065 |
| Hardness (Rockwell M): | |
| Room temp | 104 |
| 105° C | 86 |
| 24 hour water immersion, per cent uptake | .7 |
| 24 hour 1% alkali immersion: | |
| Per cent uptake | 1.0 |
| Color of alkali solution | Slightly discolored |

Example 7

126 parts melamine, 260 parts of 37% formaldehyde, 98 parts commercial furfuryl alcohol and 31.5 parts lignin were mixed and heated at about 55° C. for 3 hours, to form a resinous solution.

84 parts of the above formed resinous solution, 100 parts acid-hydrolyzed ligno-cellulose fiber and 242 parts methyl "Cellosolve" were milled together in a Baker-Perkins mixer. After thorough mixing to form a mass of doughlike consistency, the resin-fiber mixture was placed in a wire basket and heated at about 70° C. in a vacuum oven for about 6 hours, reducing the volatile contents to about 5%. This material was ground so that it passed through a 40-mesh screen.

The ground material was placed in a mold and heated and pressed at a temperature of 165° C. and pressure of about 1750 p. s. i. for a period of 5 minutes and chilled while under pressure. The molded product had the following characteristics:

| | |
|---|---|
| Specific gravity | 1.37 |
| Modulus of rupture, p. s. i | 12,950 |
| Hardness (Rockwell M): | |
| Room temp | 100 |
| 105° C | 94 |
| 24 hour water immersion, per cent uptake | .9 |
| 24 hour 1% alkali immersion: | |
| Per cent uptake | .9 |
| Color of alkali solution | Clear |

Example 8

60 parts melamine and 130 parts of 37% formaldehyde were stirred until the solution was substantially clear. 50 parts commercial furfuryl alcohol were added and the stirring continued for about 5 minutes, after which 100 parts water were added.

The solution so formed was mixed with 100 parts acid-hydrolyzed ligno-cellulose fiber in a Baker-Perkins mixer. The mixed fibrous mass was placed in a wire basket and heated in an oven at 130° C. for about 1 hour 45 minutes. After heating, the relatively dry fibrous mass was ground in a Wiley mill so that it passed through a 40-mesh screen.

The ground material with its moisture content adjusted to about 1% was placed in a mold and heated and pressed at a temperature of 165° C. and pressure of 1750 p. s. i. for 5 minutes and chilled while under pressure. The molded product had the following characteristics:

| | |
|---|---|
| Specific gravity | 1.40 |
| Modulus of rupture, p. s. i | 10,140 |
| Hardness (Rockwell M): | |
| Room temp | 118 |
| 105° C | 104 |
| 24 hour water immersion, percent uptake | .4 |
| 24 hour 1% alkali immersion, percent uptake | .4 |

The invention is not limited to the specific conditions and details given in the examples which are for the purpose of illustration of embodiments of the invention.

We claim:

1. Process of preparing a thermo-setting resin having water and alkali resistant properties, which comprises heating lignin chosen from the group consisting of isolated alkali soluble lignin and lignin contained in hydrolyzed ligno-cellulose fiber, and an alcohol chosen from the group consisting of furfuryl alcohol, ethylene glycol and glycerol, in the presence of the reaction product of an aminotriazine compound having at least one hydrogen attached to the non-ring amino nitrogen and an aldehyde, to react the lignin and the alcohol with said reaction product, the proportions of the reactive components being 1 to 3 moles alcohol to 1 mole aminotriazine to 2 to 3 moles aldehyde and the amount of lignin being 25% to 80% based on the weight of the aminotriazine.

2. Process of preparing a thermosetting resin having water and alkali resistant properties, which comprises heating lignin chosen from the group consisting of isolated alkali soluble lignin and lignin contained in hydrolyzed ligno-cellulose fiber, and furfuryl alcohol in the presence of the reaction product of an aminotriazine compound having at least one hydrogen attached to the non-ring nitrogen and formaldehyde, to react the lignin and the furfuryl alcohol with said reaction product, the proportions of the reactive components being 1 to 3 moles furfuryl alcohol to 1 mole aminotriazine to 2 to 3 moles formaldehyde and the amount of lignin being 25% to 80% based on the weight of the aminotriazine.

3. Process of preparing a thermo-setting resin having water and alkali resistant properties, which comprises heating melamine, formaldehyde, furfuryl alcohol and alkali soluble lignin to form a reaction material, mixing the reaction material with hydrolyzed ligno-cellulose fiber, heating the mixed material to substantially reduce the volatile content, and subjecting the material to heat and pressure to form a consolidated product, said reactive components being in the proportions of 1 to 3 moles furfuryl alcohol to 1 mole melamine to 2 to 3 moles formaldehyde and the lignin being present in amount of 25 to 80% based on the weight of the melamine.

4. A thermo-setting resin having water and alkali resistant properties, which comprises the reaction product of lignin chosen from the group consisting of isolated alkali soluble lignin and lignin contained in hydrolyzed ligno-cellulose fiber, an alcohol chosen from the group consisting of furfuryl alcohol, ethylene glycol and glycerol, an aminotriazine compound having at least one hydrogen attached to the non-ring amino nitrogen, and an aldehyde, said reactive components being in the proportion of 1 to 3 moles alcohol to 1 mole aminotriazine to 2 to 3 moles aldehyde and the amount of lignin being 25% to 80% based on the weight of the aminotriazine.

5. A thermo-setting resin having water and alkali resistant properties, which comprises the reaction product of lignin chosen from the group consisting of isolated alkali soluble lignin and lignin contained in hydrolyzed ligno-cellulose fiber, furfuryl alcohol, an aminotriazine compound having at least one hydrogen attached to the non-ring amino nitrogen, and formaldehyde, said reactive components being in the proportion of 1 to 3 moles furfuryl alcohol to 1 mole aminotriazine to 2 to 3 moles formaldehyde and the amount of lignin being 25% to 80% based on the weight of the aminotriazine.

6. A thermosetting resin having water and alkali resistant properties, which comprises the reaction product of lignin chosen from the group consisting of isolated alkali soluble lignin and lignin contained in hydrolyzed ligno-cellulose fiber, furfuryl alcohol, melamine and formaldehyde, said reactive components being in the proportion of 1 to 3 moles furfuryl alcohol to 1 mole melamine to 2 to 3 moles formaldehyde and the amount of lignin being 25% to 80% based on the weight of the melamine.

RAYMOND NORRIS EVANS.
ANGELO PAUL INGRASSIA.

REFERENCES CITED

The following references are of record in the file of this patent:

UNITED STATES PATENTS

| Number | Name | Date |
|---|---|---|
| 2,068,926 | Nevin | Jan. 26, 1937 |
| 2,156,160 | Olson | Apr. 25, 1939 |
| 2,197,357 | Widmer | Apr. 16, 1940 |
| 2,197,724 | Hovey | Apr. 16, 1940 |
| 2,320,817 | D'Alelio | June 1, 1943 |
| 2,338,602 | Schur | Jan. 4, 1944 |
| 2,345,543 | Wohnsiedler et al. | Mar. 28, 1944 |
| 2,368,451 | D'Alelio | Jan. 30, 1945 |
| 2,404,840 | Harvey | July 30, 1946 |
| 2,407,376 | Maxwell | Sept. 10, 1946 |

FOREIGN PATENTS

| Number | Country | Date |
|---|---|---|
| 282,635 | Great Britain | Dec. 6, 1928 |